United States Patent
Kajita

(10) Patent No.: US 7,308,924 B2
(45) Date of Patent: Dec. 18, 2007

(54) PNEUMATIC RADIAL TIRE

(75) Inventor: Hiroaki Kajita, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 10/843,437

(22) Filed: May 12, 2004

(65) Prior Publication Data

US 2004/0238094 A1 Dec. 2, 2004

(51) Int. Cl.
  *B60C 15/00* (2006.01)
  *B60C 15/06* (2006.01)
(52) U.S. Cl. .................. 152/552; 152/539; 152/554
(58) Field of Classification Search ............... 152/539, 152/541, 542, 543, 552, 554
  See application file for complete search history.

(56) References Cited

U.S. PATENT DOCUMENTS

| 4,706,725 A | | 11/1987 | Okuni et al. |
| 4,773,463 A | | 9/1988 | Okuni et al. |
| 5,151,139 A | * | 9/1992 | Takada ...................... 152/454 |
| 5,553,646 A | * | 9/1996 | Ando et al. ............. 152/209.14 |

FOREIGN PATENT DOCUMENTS

| EP | 0557101 | * | 8/1993 |
| EP | 0 835 768 A1 | | 4/1998 |
| EP | 0 985 558 A2 | | 3/2000 |
| EP | 1 095 796 A2 | | 5/2001 |
| JP | 62-157816 | * | 7/1987 |
| JP | 2-18104 A | | 1/1990 |
| JP | 4-215508 | * | 8/1992 |
| JP | 07-276929 | * | 10/1995 |
| JP | 2001-171318 | * | 6/2001 |
| WO | WO 01/34412 | * | 5/2001 |

* cited by examiner

Primary Examiner—Justin R. Fischer
(74) Attorney, Agent, or Firm—Birch, Stewart, Kolasch & Birch, LLP

(57) ABSTRACT

A pneumatic radial tire which includes a tread portion defining an overall diameter of the tire under a normally-inflated unloaded state and a ground contacting width under a normally inflated loaded state; a pair of sidewall portions defining an overall width of the tire there between under the normally-inflated unloaded state; a pair of bead portions each with a bead core therein; a carcass extending between the bead portions through the tread portion and, sidewall portions; and a belt disposed radially outside the carcass in the tread portion, wherein the overall diameter of the tire is in the range of from 750 to 820 mm; the ground contacting width is in the range of from 85 to 90% of said overall width of the tire; and the carcass comprises an ultrahigh-turnup ply extending between the bead portions through the tread portion and sidewall portions and turned up around the bead core in each of the bead portions so that the turned-up portions each extend radially outwardly into the tread portion through the sidewall portions, and the turned-up portions each terminate axially inward of the axial ends of the belt.

6 Claims, 2 Drawing Sheets

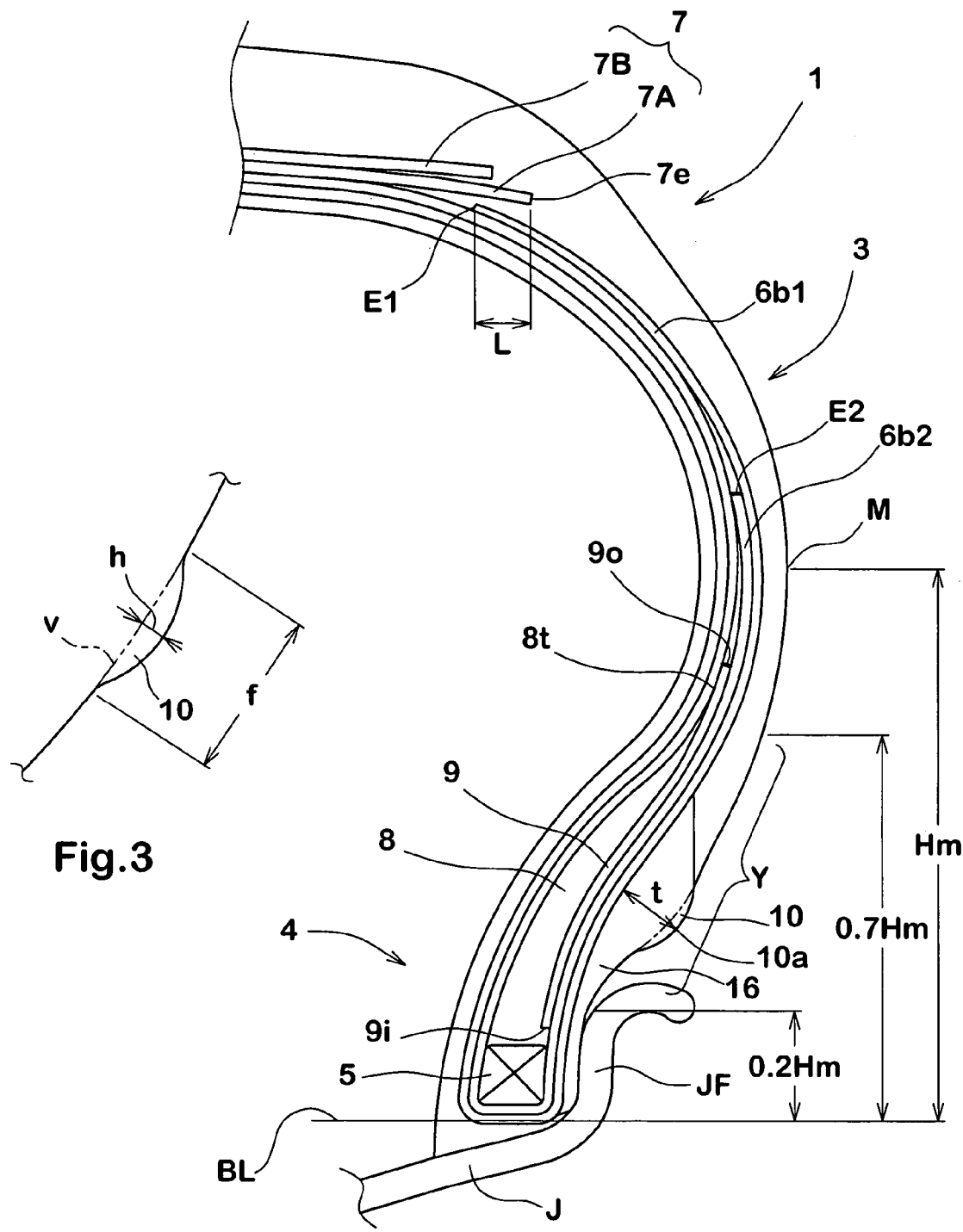

PNEUMATIC RADIAL TIRE

This Nonprovisional application claims priority under 35 U.S.C. § 119(a) on Patent Application No(s). 2003-155096 filed in JAPAN on May 30, 2003, the entire contents of which are hereby incorporated by reference.

The present invention relates to a pneumatic tire, more particularly to a design of a radial tire having a relatively large load rating which can improve steering stability even in a low load factor range.

In recent years, sport utility vehicle (SUV) are rising in popularity because they have the maneuverability of sport car, the amenity of saloon car, the comfortableness of minivan, the running ability of a four-wheel-drive car, etc.

Sport utility vehicles are usually designed to use with relatively large-sized pneumatic tires, considering the body size. Although large-sized tires have a large maximum load rating per se, the load factor in actual use in a SUV is relatively small because of the relatively light vehicle weight. Further, the sport utility vehicles are generally provided with a high-power engine. Thus, unlike the vehicles in other categories, the tires of the SUVs are used under big torque and light tire load for the large-sized tire. Furthermore, the tread portion of such a large-sized tire is often provided with a relatively small radius of curvature (in other words, the tread camber quantity is relatively large) in order to maintain a sufficient ground contact pressure in the tread center region under higher or normal load factor conditions.

When pneumatic radial tires are used under a low load factor range, steering stability is liable to deteriorate.

If pneumatic radial tires are used under usual conditions, the steering stability may be improved by increasing the tire rigidity which can be achieved, for example, by using high modulus cords in the belt and/or carcass, using harder rubber compounds in tire components, providing additional reinforcing cord layers and the like.

In case of the sport utility vehicles, however, those techniques are not effectual in improving the steering stability.

SUMMARY OF THE INVENTION

It is therefore, an object of the present invention to provide a pneumatic radial tire suitable for use with a SUV, in which the steering stability is improved even in a low load factor range.

According to the present invention, the pneumatic radial tire comprises:

a tread portion defining an overall diameter of the tire under a normally-inflated unloaded state and a ground contacting width under a normally inflated loaded state;

a pair of sidewall portions defining an overall width of the tire under said normally-inflated unloaded state;

a pair of bead portions each with a bead core therein;

a carcass extending between the bead portions through the tread portion and sidewall portions; and a belt disposed radially outside the carcass in the tread portion, wherein the overall diameter of the tire is in a range of from 750 to 820 mm, the ground contacting width is in a range of from 85 to 90% of the overall width of the tire, and the carcass comprises an ultrahigh-turnup ply extending between the bead portions through the tread portion and sidewall portions and turned up around the bead core in each of the bead portions so that the turned-up portions each extend radially outwardly into the tread portion through the sidewall portions, and terminate axially inward of the axial ends of the belt.

Here, the overall diameter (D) of the tire is the maximum diameter measured at the radially outermost point in the tread portion under the undermentioned normally-inflated, unloaded state.

The overall width of the tire (W) is the axial distance between the axially outermost points in the sidewall portions measured, including lettering, ornamental pattern and the like if any, under the normally-inflated, unloaded state.

The ground contacting width (TW) is the maximum axial width of the ground contacting area measured under the normally inflated loaded state.

The normally-inflated, unloaded state is such that the tire is mounted on a standard wheel rim and inflate to a standard pressure but loaded with no tire load. The normally inflated loaded state is such that the tire is mounted on the standard wheel rim and inflate to the standard pressure and loaded with the standard tire load. The standard wheel rim is a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Air-pressure/Maximum-load Table or similar table. However, in case of passenger car tires into which the SUV tires are usually categorized, the standard pressure and standard tire load are uniformly defined by 180 kPa and 88% of the maximum tire load, respectively.

BRIEF DESCRIPTION OF THE DRAWINGS

An embodiment of the present invention will now be described in detail in conjunction with the accompanying drawings, wherein

FIG. 2 is an enlarged partial view thereof; and

FIG. 3 is an enlarged cross sectional view showing a hump.

DETAILED DESCRIPTION OF THE INVENTION

Figure 1:
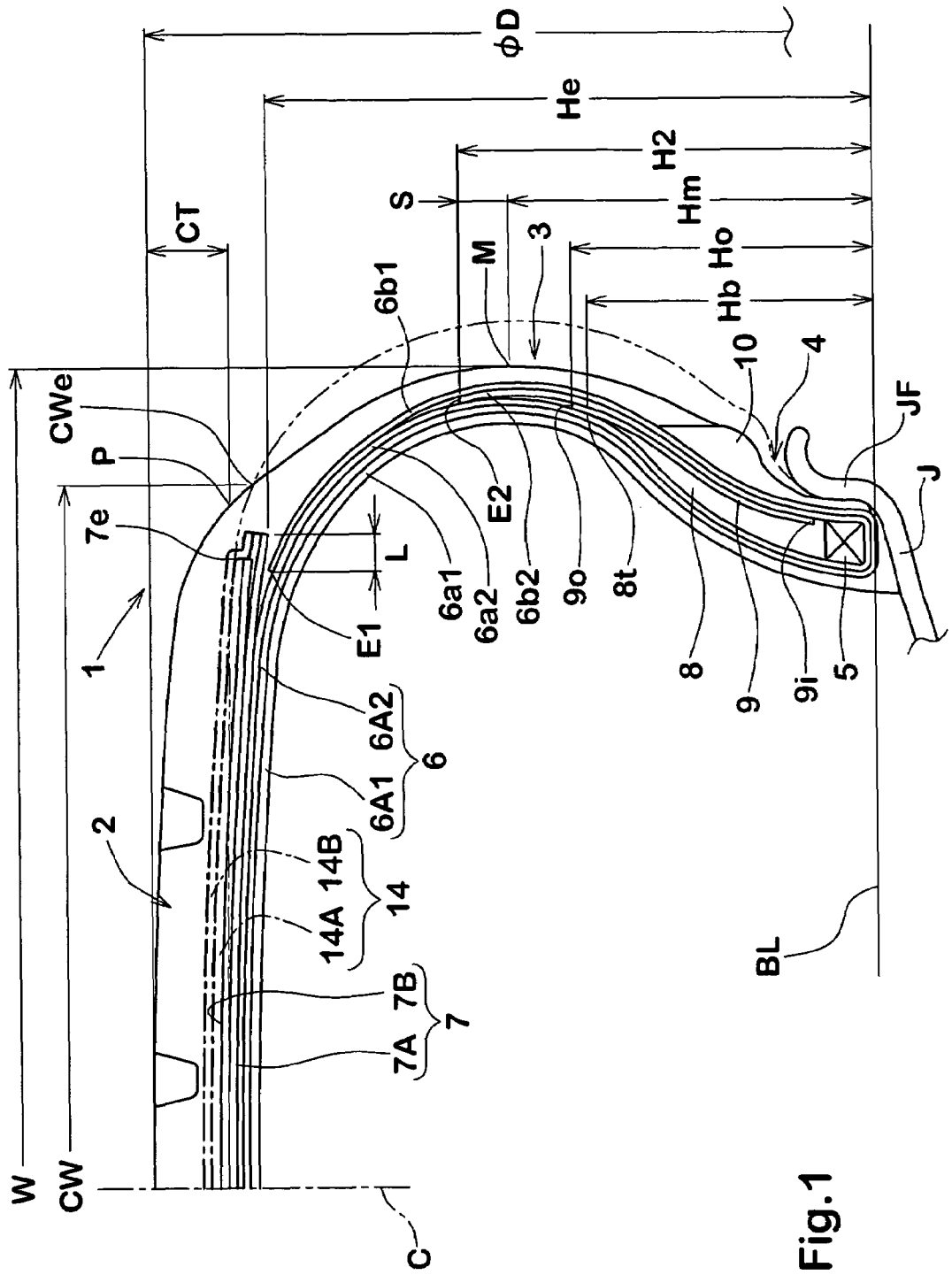
FIG. 1 is a cross sectional view of a radial tire according to the present invention wherein the normally-inflated, unloaded state is indicated by a continuous line, and the normally-inflated, maximally-loaded state is indicated by a chain double-dashed line.

In the drawings, the pneumatic radial tire 1, according to the present invention, comprises a tread portion 2, a pair of sidewall portions 3, a pair of axially spaced bead portions 4 each with a bead core 5 therein, a carcass 6 extending between the bead portions 4, and belts 7, 14 disposed radially outside the carcass 6 in the tread portion 2.

The present invention is suitably applied to pneumatic radial tires for a SUV whose overall diameter D is not less than 750 mm preferably more than 770 mm, but not more than 820 mm preferably less than 800 mm.

In view of steering stability, it is preferable that the sidewall portions 3 is not large in the radial size. It is therefore, preferable that the aspect ratio of the tire is set in the range of not more than 60%, more preferably less than 55% but not less than 45%. The wheel rim diameter is thus, in a range of from 17 to 22 inches, more preferably not less than 18 inches.

In general, when the load factor is low, as the tire deflection is small, the ground contacting area and thus the road grip become smaller. As a result, it becomes difficult to improve the steering stability. Thus, it is necessary to provide a wide ground contacting area even when the load factor is low by design.

In this light, it is desirable that the ground contacting width CW has a relatively large value which is in a range of from 85 to 90%, preferably 85 to 88% of the overall width W of the tire under a standard pressure of 180 kPa a standard tire load of 88% of the maximum tire load.

In order to achieve such a wide ground contacting width CW, the tread portion is increased in the axial width, and the tread face is decreased in the camber quantity. Specifically, the camber quantity CT is set in the range of not more than 20 mm, preferably not more than 15 mm. The camber quantity CT is measured at position P on the tread face spaced apart from the, tire equator C by an axial distance of 85% of one half of the overall width of the tire w (namely, 0.425 w) under the above-mentioned, normally-inflated, unloaded state.

In order to obtain even ground pressure distribution, it is preferred that, in the meridian section of the tire, the tread profile is defined by a multi-radius curve made up of arcs having radii gradually decreasing from the tire equator to the tread edges or a curve having a continuously varying radius. In the case of the multi-radius curve, the curve has preferably at least three different radii, preferably four, more preferably a least five different radii.

The above-mentioned belt comprises a breaker 7 and optionally a band 14.

The breaker 7 is composed of two cross breaker plies: a radially inner breaker ply 7A and a radially outer breaker ply 7B, each made of parallel cords laid at an angle of from 10 to 45 degrees with respect to the tire equator so as to cross the cords of the next ply. It is preferable that the breaker plies are gradually decreased in width from the radially inside to the outside of the tire. In this embodiment, steel cords are used in each ply. But, organic fiber cords, e.g. aramid, rayon and the like can be used according to need. The widest breaker ply which defines the width of the belt is the innermost ply 7A. The outer edges 7e of the breaker 7, namely, those of the widest breaker ply, are preferably placed at an axial distance from the tire equator C in the range of from 80 to 85% of one half of the overall width of the tire w under the normally-inflated, unloaded state.

The band 14 is disposed radially outside the breaker 7 and composed of at least one ply of cords wound at a cord angle of not more than 5 degrees with respect to the circumferential direction. In this embodiment, the band 14 is composed of two full-width plies 14A and 14B each having a width substantially equal to or slightly wider than the width of the breaker 7. The so called edge bands are not provided. For the band cords, organic fiber cords are preferably used. In this embodiment, high modulus PEN (Polyethylene Naphthalate) cords can be used.

The carcass 6 is composed of at least one ply 6A1 of rubberized cords arranged radially at an angle of 75 to 90 degrees with respect to the tire equator C. In this embodiment, the carcass 6 is composed of two plies 6A1 and 6A2 of rubberized cords arranged radially at substantially to 90 degrees with respect to the tire equator C.

For the carcass cords, organic fiber cords, e.g. rayon, nylon, polyester, aramid and the like can be used. In this embodiment, rayon cords are used in all the carcass plies because rayon cords are comparatively high in modulus and can provide appropriate rigidity for the carcass.

The above-mentioned carcass ply 6A1 is an ultrahigh-turnup ply. The carcass ply 6A2 is a high turnup ply.

The high turnup ply 6A2 is extended between the bead portions 4 through the tread portion 2 and sidewall portions 3 and turned up around the bead core 5 in each bead portion 4 from the inside to the outside of the tire to form a pair of turned-up portions 6b2 and a toroidal main portion 6a2 therebetween. The turned-up portions 6b2 each extend radially outwardly from the bead portion 4 into the sidewall portion 3, and the radially outer ends E2 thereof are terminated between the belt edge 7e and the maximum section width position M.

Here, the maximum section width position M is essentially a position in which the maximum axial width of the carcass lies under the normally-inflated, unloaded state. This is typically the same as a position on the outer surfaces of the sidewall portions in which the maximum tire section width lies.

The ultrahigh-turnup ply 6A1 is extended between the bead portions 4 through the tread portion 2 and sidewall portions 3 and turned up around the bead core 5 in each bead portion 4 from the inside to the outside of the tire to form a pair of turned-up portions bb1 and a toroidal main portion 6a1 therebetween. The turned-up portions 6b1 each extend radially outwardly from the bead portion 4 into the tread portion 2 through the sidewall portion 3 over the above-mentioned turned-up portions 6b2. The radially outer ends E1 of the turned-up portions 6b1 terminate axially inward and radially inward of the respective axial edges 7e of the breaker 7, while adjoining the carcass ply main portion but separating from the breaker 7.

The width L of the axial overlap between of the turned-up portion 6b1 of the ultrahigh-turnup ply 6A1 with the breaker 7 is preferably set in the range of at least 3 mm, more preferably more than 5 mm, but not more than 20 mm in order to avoid stress concentration on the ply edges and unnecessary weight increase.

When the load factor of the tire is lower, as the carcass cords' tension is smaller, the circumferential torsional strain of the tire especially at the time of braking or accelerating tends to concentrate on the relatively low rigidity part in the sidewall portion. This causes a transfer lag of the braking force or driving force as well as a deterioration in the steering response. Here, the circumferential torsional strain means the torsional strain around the tire axis generated between the tread face and bead bottom.

As the turned-up portion 6b1 and main portion 6A1 of the ultrahigh-turnup ply 6A1 increase the rigidity of the sidewall portion against the circumferential torsional strain, the transfer lag of the braking force or driving force is reduced. Further, the effective swift transfer of the driving force and the braking force may be possible because a wide ground contacting width CW is reserved even under a low load factor.

If the carcass 6 includes two or more ultrahigh-turnup plies 6A1, the ride comfort will deteriorate because the radial rigidity of the sidewall portions 3 becomes excessively high. If the carcass 6 is made up of two high turnup ply 6A2, namely, no ultrahigh-turnup ply is included, the rigidity is decreased in the portion between the belt and the turned-up portion, and the above-mentioned transfer lag is liable occur. Even in a combination of the ultrahigh-turnup ply 6A1 and high turnup ply 6A2, if the turned-up portion 6b2 terminates on the radially inside of the maximum section width position M, the rigidity becomes insufficient and the transfer lag is again liable to occur.

In order to obtain improved ride comfort and steering stability in a well-balanced manner, the difference S(=H2−Hm) is preferably set in the range of not less than +0%, preferably more than 15%, but not more than 30%, preferably less than 25% of the difference (He−Hm). The difference S(=H2−Hm) is of the height H2 of the radially outer end E2 of the turned-up portion 6b2 of the high turnup ply 6A2 from the height Hm of the maximum section width position M. The difference (He−Hm) is of the height He of the outer edge 7e of the breaker 7 from the height Hm. Each height is defined as measured in the radial direction from the bead base line BL.

The turned-up portion 6b2 may be disposed on the axially outside of the ultrahigh turned-up portion 6b1, but in this embodiment, in order to increase the resistance to ply edge separation and thereby to improve durability, they are arranged reversely so that the ultrahigh turned-up portion 6b1 covers the axially outside of the turned-up portion 6b2.

Further, in each of the bead portions 4, a bead apex 8 and a reinforcing cord layer 9 are provided.

The bead apex 8 is made of a relatively hard rubber compound having a JIS durometer A hardness of not less than 85, preferably more than 88, but not more than 95, preferably less than 92. The bead apex 8 is disposed on the radially outside of the bead core 5 and extends radially outwardly therefrom. The height Hb of the radially outer end 8t of the bead apex 8 is set in the range of less than 100%, preferably less than 95%, more preferably less than 90%, but not less than 75%, preferably more than 80% of the height Hm of the maximum section width position, each measured from the bead base line BL. The bead apex 8 may be tapered starting from its radially inner end to the radially outer end, but it is preferred that a substantially constant thickness is maintained until it extends beyond a midway point and then the thickness is decreased down to zero. Therefore, in cooperation with the ultrahigh-turnup ply 6A1 and high turnup ply 6A2, the bead apex 8 can increase the circumferential torsional rigidity of the tire more smoothly or continuously from the bead core to the belt edge, while improving or maintaining the required tire rigidity as of a tire of a large load rating.

It is preferable that the reinforcing cord layer 9 is disposed along the neutral line between compressive stress and tensile stress when the bead portion is subjected to bending deformation in order not to deteriorate ride comfort. In this embodiment, such neutral line lies adjacently to the axial outer surface of the bead apex 8. Thus, the reinforcing cord layer 9 is disposed on the axial outer surface of the bead apex 8. The reinforcing cord layer 9 is composed of a single ply of organic fiber cords or steel cords, the ply extending continuously in the tire circumferential direction along axially outside of the bead apex 8. The cords are laid at an angle of not less than 30 degrees, preferably more than 40 degrees, but not more than 60 degrees, preferably less than 50 degrees with respect to the circumferential direction. In this embodiment, steel cords are used for their excellent reinforcing effect. The reinforcing cord layer 9 has a radially inner end 9i located near but slightly above the bead core 5, and a radially outer end 9o placed between the maximum section width position M and the radially outer end 8t of the bead apex 8. Preferably, the radially outer end 9o is placed at a radial height Ho in the range of from 80 to 90%, more preferably, from 85 to 90% of the height Hm of the maximum section width position.

If the radially outer end 9o is placed near the radially outer end 8t of the bead apex, separation becomes liable to occur. Therefore, it is preferable that a distance F of at least 5 mm is given between the ends 8t and 9o. The reinforcing cord layer 9 thus effectively increases the circumferential torsional rigidity without increasing the axial bending rigidity of the bead portion 4.

It is preferable for the durability of the sidewall lower portion that the carcass ply turned-up portions 6b1 and 6b2 are placed near the thickness center line to prevent the carcass cords from being subjected to compressive stress repeatedly during running. In this embodiment, therefor, a circumferentially continuous hump 10 is formed in the sidewall lower region Y which is defined as ranging from 20% to 70% of the radial height Hm of the maximum section width position M from the bead base line BL. Preferably, the hump 10 is formed in a region ranging from 20% to 60%, more preferably a region ranging from 25% to 50% of the radial height Hm. The hump 10 protrudes axially outwardly from a virtual contour line V, and the protrusion h therefrom is set in the range of not less than 5 mm. Here, the virtual contour line v is a line smoothly connecting the contours on both sides of the hump 10 under the normally-inflated, unloaded state, various shapes for example, a smooth arc as shown in FIG. 3, substantially trapezoid, substantially triangle and the like may be used as the contour of the hump 10 in the tire meridian section.

The rubber thickness (t) measured along the shortest path from the peak 10a of the hump 10 to the carcass 6 is set in the range of not less than 5 mm preferably not less than 7 mm, but preferably not more than 10 mm, more preferably not more than 9 mm, still more preferably not more than 8 mm.

If the thickness (t) becomes less than 5 mm, it becomes impossible to prevent the carcass cords from the compressive stress. If the thickness (t) is more than 10 mm, heat generation increases and durability is liable to deteriorate.

Under a low load factor, when the tire is subjected to a side force for example when turning the steering wheel or during cornering, the contact between the radially outer curved portion of the rim flange and the transitional zone from the bead portion to the sidewall portion becomes less or the contact pressure becomes low. This means that the reactive force against the side force is small, and therefore the steering response and steering stability are not good. By providing the hump, the reactive force can be increased to improve the steering response and steering stability.

In order to achieve the above-explained effects, the width f of the hump 10 is set in the range of not less than 4 mm, preferably more than 5 mm, but not more than 10 mm, preferably less than 7 mm.

Comparison Tests

Radial tires of size of P265/50R20 106V (Rim size: 20×8JJ) having specifications shown in Table 1 were made and tested for steering stability, ride comfort and durability.

Steering Stability and Ride Comfort Test

A Japanese car categorized as SUV and provided on all the four wheels with test tires was run in a tire test course, and the test driver evaluated steering stability and ride comfort into ten ranks, wherein the higher the rank number, the better the performance. (vehicle weight: 1880 kg, Engine size: 4500 cc, Tire pressure: 220 kPa)

Durability Test

The test tire mounted on a 20×8JJ rim was subjected to an indoor test using a tire test drum prescribed by the Procedure for Load/speed Performance Tests of the Economic Commission for Europe (ECE-30) and the speed at which any failure occurred and the running time at that speed were measured. (Tire pressure: 220 kPa)

The test results are shown in Table 1.

TABLE 1

| Tire | Ref. 1 | Ref. 2 | Ref. 3 | Ex. 1 | Ex. 2 | Ex. 3 | Ex. 4 | Ex. 5 | Ex. 6 |
|---|---|---|---|---|---|---|---|---|---|
| Tire diameter (mm) | 775 | 775 | 775 | 775 | 775 | 775 | 775 | 775 | 775 |
| Width ratio CW/W (%) | 86 | 83 | 83 | 86 | 86 | 86 | 86 | 86 | 86 |
| Band | | | | | | | | | |
| Number of full-width ply | 0 | 0 | 0 | 0 | 2 | 2 | 2 | 2 | 2 |
| Cord material | PEN | PEN | PEN | PEN | PEN | PEN | PEN | PEN | PEN |
| Breaker | | | | | | | | | |
| Number of ply | 2 | 2 | 2 | 2 | 2 | 2 | 2 | 2 | 2 |
| Cord material | steel | steel | steel | steel | steel | steel | steel | steel | steel |
| Carcass | | | | | | | | | |
| Number of ply | | | | | | | | | |
| Ultrahigh turnup ply | 0 | 0 | 1 | 1 | 1 | 1 | 1 | 1 | 1 |
| High turnup ply | 2 | 2 | 1 | 1 | 1 | 1 | 1 | 1 | 1 |
| Cord material | rayon | rayon | rayon | rayon | rayon | rayon | rayon | rayon | rayon |
| Bead apex | | | | | | | | | |
| Height ratio Hb/Hm(%) | 85 | 85 | 85 | 85 | 85 | 70 | 85 | 85 | 85 |
| Reinforcing cord layer | | | | | | | | | |
| Number of ply | 1 | 1 | 1 | 1 | 1 | 1 | 1 | 1 | 1 |
| Cord material | steel | steel | steel | steel | steel | steel | steel | steel | steel |
| Cord angle | 40 to 50 | 40 to 50 | 40 to 50 | 40 to 50 | 40 to 50 | 40 to 50 | 40 to 50 | 40 to 50 | 40 to 50 |
| Height ratio Ho/Hm(%) | 87 | 87 | 87 | 87 | 87 | 87 | 75 | 100 | 87 |
| Hump | | | | | | | | | |
| Swelling h (mm) | 2 | 2 | 2 | 2 | 2 | 2 | 2 | 2 | 2 |
| Rubber thickness t (mm) | 7.5 | 7.5 | 7.5 | 7.5 | 4 | 7.5 | 7.5 | 7.5 | 7.5 |
| Test result | | | | | | | | | |
| Steering stability | 6 | 6 | 6 | 7 | 4 | 9 | 9 | 9 | 10 |
| Ride comfort | 4 | 6 | 6 | 6 | 10 | 9 | 9 | 6 | 10 |
| Durability Speed(km)-Time(min.) | 220-15 | 220-20 | 230-15 | 230-10 | 240-20 | 250-20 | 250-20 | 250-20 | 250-20 |

From the test results, it was confirmed that the steering stability, ride comfort and durability can be effectively improved.

As described above, according to the present invention, the pneumatic radial tire displays a wide ground contacting width and high circumferential torsional rigidity even under relatively low load factor, and thus it is suitable for use with SUV.

The invention claimed is:

1. A pneumatic radial tire comprising
a tread portion defining an overall diameter of the tire under a normally-inflated unloaded state, and a ground contacting width under a normally inflated loaded state,
a pair of sidewall portions defining an overall width of the tire therebetween under said normally-inflated unloaded state,
a pair of bead portions each with a bead core therein,
a carcass extending between the bead portions through the tread portion and sidewall portions, and
a belt disposed radially outside the carcass in the tread portion, wherein
said normally-inflated loaded state is a state of the tire which is mounted on a standard wheel rim, inflated to 180 kPa and loaded with 88% of a maximum tire load for the tire,
said normally-inflated unloaded state is a state of the tire which is mounted on the standard wheel rim and inflated to 180 kPa but loaded with no tire load
said overall diameter of the tire is in a range of from 750 to 820 mm,
said ground contacting width is in a range of from 85 to 90% of said overall width of the tire, and
an aspect ratio of the tire is a range of not more than 60% but not less than 45%,
said carcass comprising
an ultrahigh-turnup ply extending between the bead portions through the tread portion and sidewall portions and turned up around the bead core in each said bead portion so that the turned up portions each extend radially outwardly into the tread portion through the sidewall portions, and the turned-up portions each terminate axially inward of the I axial ends of the belt, wherein
said carcass further includes
a high turnup ply extending between the bead portions through the tread portion and sidewall portions and turned up around the bead core in each said bead portion so that the turned-up portions extend radially outwardly into the sidewall portions and terminate between a maximum section width position and said axial ends of the belt, and
said ultrahigh-turnup ply and high turnup ply are both turned up from the inside to the outside of the tire, and the turned-up portions of the high turnup ply axially inward of the respective turned-up portions of the ultra-turnup ply,
said sidewall portions are each provided on the axially outer surface thereof with a circumferentially continuously extending hump for placing the carcass ply turned-up portion near the thickness center line of a sidewall lower region, wherein the hump is formed within a zone ranging from 20% to 70% of the radial height of said maximum section width position (M), in said normally-inflated uploaded state, the hump being position radially outside a flange of the wheel rim so as not to be in contact with the flange, and defined as having an axially outwardly protruding arched profile, whereby the most protrusive point of the hump is positioned axially inward of said maximum section width position (M)

each said bead portion is provided with a rubber bead apex and a reinforcing cord layer, wherein said rubber bead apex extends radially outwardly from the radially outside of the bead core, and the reinforcing cord layer is disposed axially outside the bead apex and axially inside said turned-up portions of the high turnup ply, and the reinforcing cord layer is made of cords laid at an angle of not less than 30 degrees and not more than 60 degrees with respect to the circumferential direction.

2. The pneumatic radial tire according to claim 1, wherein the radially outer end of the rubber bead apex is radially inwards of the maximum section width position, the radially inner end of the reinforcing cord layer is adjacent to the bead core, and the radially outer end is between the radially outer end of the bead apex and the maximum section width position.

3. The pneumatic radial tire according to claim 1, wherein the hump is positioned within a zone ranging from 25% to 50% of the radial height of said maximum section width position.

4. The pneumatic radial tire according to claim 1, which has a round shoulder and a camber quantity CT of not more than 20 mm, wherein the camber quantity CT is measured at position (P) on the tread face spaced apart from the tire equator by an axial distance of 85% of one half of said overall width of the tire under the normally-inflated, unloaded state.

5. The pneumatic radial tire according to claim 1, wherein in the meridian section of the tire, the tread portion is provided with a tread profile gradually decreased in the radius curvature from the tire equator to the tread edge so that a camber quantity CT becomes not more than 20 mm, wherein the camber quantity CT is measured at position (P) on the tread face spaced apart from the tire equator by an axial distance of 85% of one half of said overall width of the tire under the normally-inflated, unloaded state.

6. The pneumatic tire of claim 1, wherein the thickness of the hump from the peak of the hump to the carcass is from 5 mm to 10 mm and the width of the hump where it protrudes axially outward from the virtual contour line of the tire is from 4 mm to 10 mm.

* * * * *

UNITED STATES PATENT AND TRADEMARK OFFICE
CERTIFICATE OF CORRECTION

| | |
|---|---|
| PATENT NO. | : 7,308,924 B2 |
| APPLICATION NO. | : 10/843437 |
| DATED | : December 18, 2007 |
| INVENTOR(S) | : Hiroaki Kajita |

Page 1 of 1

It is certified that error appears in the above-identified patent and that said Letters Patent is hereby corrected as shown below:

On the Cover Page:

Insert the following item.

Item (30) Foreign Application Priority Data

May 30, 2003 (JP)………………….. 2003-155096

Signed and Sealed this

Fifteenth Day of July, 2008

JON W. DUDAS
*Director of the United States Patent and Trademark Office*